A. DREES.
HIGH PRESSURE CONDUIT.
APPLICATION FILED NOV. 24, 1908.
980,929.
Patented Jan. 10, 1911.
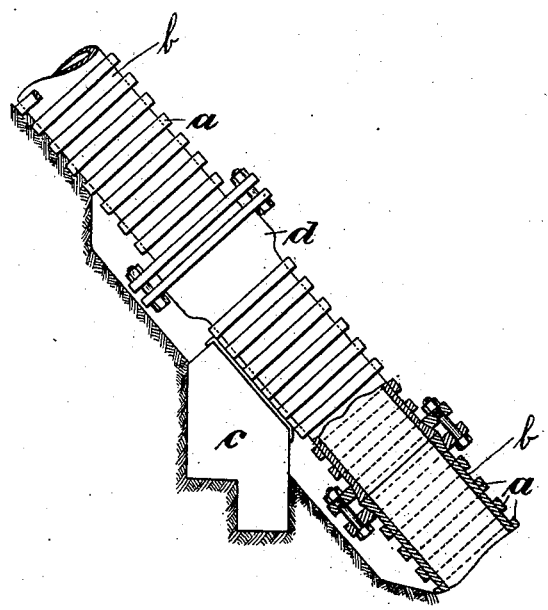
WITNESSES
W. P. Burke
A. F. Heuman
INVENTOR
Albrecht Drees
BY
ATTY.

UNITED STATES PATENT OFFICE.

ALBRECHT DREES, OF KATTOWITZ, GERMANY.

HIGH-PRESSURE CONDUIT.

980,929. Specification of Letters Patent. Patented Jan. 10, 1911.

Application filed November 24, 1908. Serial No. 464,253,

*To all whom it may concern:*

Be it known that I, ALBRECHT DREES, a subject of the German Emperor, residing at Kattowitz, Silesia, Germany, have invented new and useful Improvements in High-Pressure Conduits, of which the following is a specification.

This invention relates to high-pressure conduits and more particularly to conduits of this character adapted for use with turbine plants.

One of the objects of the invention is to construct a conduit by strengthening the pipe at suitable intervals throughout its length, whereby the body portion of the pipe may be comparatively thin without exposing it to the danger of its being ruptured by the pressure exerted therein by the fluid flowing therethrough.

Another object is to provide a support upon which the strengthening members associated with the expansion joint of the pipe may rest, thus preventing any wear of the pipe due to longitudinal movement of the conduit under the action of expansion or contraction.

Other objects will in part be obvious and in part pointed out hereinafter.

In order that the invention may be clearly understood, reference is made to the accompanying drawing in which an illustrative embodiment of the invention is shown by way of example and in which is shown a side elevation view of a conduit, constructed in accordance with the invention, part being broken away for the sake of clearness.

Referring to the drawing, the pipe $b$, which is preferably of thin wrought iron, is provided at suitable intervals with strengthening rings, $a$, which are shrunk thereon. By shrinking the rings upon the pipe, not only is there a saving in weight and material as compared with the ordinary pipe not provided with strengthening rings, but the weight is still further reduced owing to the shrinking pressure which compresses the pipe, thereby enabling it to be made considerably thinner than would be possible if the strengthening bands were placed on cold. The expansion socket, $d$, of any suitable form, is also provided with suitable strengthening rings, which rings rest directly upon a suitable foundation, $c$, as clearly shown in the drawing, the expansion socket being readily accessible and not buried in the earth. By means of this construction, it will be seen that the rings transmit the bearing pressure uniformly and, furthermore, during any longitudinal movement of the conduit due to expansion and contraction any wear will be taken up by the rings and not by the pipe. Another advantage, which will be apparent, is that the body of the pipe at the expansion joint is spaced from the foundation $c$, thus reducing to a minimum any chance of the pipe rusting, due to water collecting between the foundation and the pipe.

What I claim as my invention and desire to secure by Letters Patent is:

In apparatus of the class described, piping adapted to lead a fluid from one point to another, an expansion socket interposed in said piping to allow for expansion and contraction of the piping, strengthening rings shrunk upon the piping adjacent said expansion socket, and a support upon which said rings rest, whereby the piping will be maintained out of contact with said support, thereby permitting the piping to move without subjecting the piping to wear.

In testimony whereof I have signed my name to this specification in the presence of two subscribing witnesses.

ALBRECHT DREES.

Witnesses:
ERNST KATZ,
ERNST BLEISCH.